United States Patent Office 3,288,563
Patented Nov. 29, 1966

3,288,563

METHOD OF PRODUCING A POWDER FOR MAGNETIC RECORDING CONSISTING OF MAGNETIC IRON OXIDE

Cornelis Johannes Klomp and Gerard Willem van Oosterhout, Eindhoven, Netherlands, assignors to North American Philips Company, Inc., New York, N.Y., a corporation of Delaware No Drawing. Filed May 3, 1963, Ser. No. 277,683
Claims priority, application Netherlands, June 8, 1962, 279,551
6 Claims. (Cl. 23—200)

The invention relates to a method of producing a powder of magnetic iron oxide, $\gamma$-$Fe_2O_3$, for magnetic recording purposes, to a magnetic powder produced by said method, to a magnetic lacquer containing such a powder and to a magnetic tape provided with such a magnetic lacquer.

The magnetic sound recording and reproducing technique exhibits an ever growing need for operating with very low wavelengths, for example of 5$\mu$ and less, due to the tendency of employing lower and lower speeds of the sound recording and reproducing tape. It may be stated that in the previous ten years the speed of the tape has gradually been lowered from 78 cms./sec. to 4¾ cms./sec. It is known that the strength of the reproduced sound signal decreases with a decreasing wavelength. As soon as said strength has dropped to a value of the order of the noise level, a further reduction of the tape speed is, of course, out of the question, so that a reduction of noise alone offers further possibilities.

It is known that particularly magnetic iron oxide, $\gamma$-$Fe_2O_3$, is widely used as a sound carrier for magnetic recording. In one of the commonest methods of producing said substance crystalline ferric oxide hydrate, having the chemical formula of $Fe_2O_3 \cdot nH_2O$, wherein $1 \leq n, \leq 2$ (in literature often termed goethite or $\alpha$-FeOOH) is dehydrated, then reduced and subsequently oxidized to obtain $\gamma$-$Fe_2O_3$. The ferric oxide hydrate, the starting material, has hitherto been produced usually as follows. Into a neutral or weak-acid suspension of ferrous hydroxide or ferrous carbonate in water air is introduced. Thus a suspension of ferric oxide hydrate is obtained. To a neutral to weak-acid solution of ferrous sulphate in water is then added metallic iron and a quantity of the said suspension of ferric oxide hydrate, air being again led into the solution. Thus finely divided, crystalline ferric oxide hydrate is precipitated.

The invention relates to the production of a powder of magnetic, iron oxide, $\gamma$-$Fe_2O_3$, which permits the manufacture of magnetic tape differing from the best hitherto known tape by greatly reduced noise. In accordance with the invention the powder of magnetic iron oxide, $\gamma$-$Fe_2O_3$, is produced by oxidizing a ferrous compound of poor solubility in water in an alkaline liquid mainly consisting of water and having an $(OH)^-$ ion concentration of more than 0.2 normal (0.2 gm.-ion/liter) into crystalline ferric oxide hydrate having the chemical composition of the formula: $Fe_2O_3 \cdot nH_2O$, wherein $1 \leq n, \leq 2$, which is then converted in known manner by reduction and subsequent oxidation into magnetic iron oxide, $\gamma$-$Fe_2O_3$. With a frequency of 10 kc./s. and a tape speed of 4¾ cms./sec. the magnetic tape provided with the magnetic powder produced in accordance with the invention produces a maximum signal intensity which is equal to and sometimes even higher than that of the best magnetic tape hitherto known and is distinguished from the latter by a strikingly lower noise level.

An essential feature of the invention is that the oxidation of the ferrous compound concerned is performed in a strongly alkaline medium, i.e. in a medium having an $OH^-$ ion concentration of more than 0.2 normal. As stated above, the oxidation of the ferrous compound into ferric oxide hydrate for use as starting material for the production of magnetic iron oxide, $\gamma$-$Fe_2O_3$, for magnetic recording has hitherto always been performed in a neutral to weak-acid medium. It is described, it is true (see for example an article of W. Feithknecht in "Zeitschrift für Elektrochemie" 63, No. 1, 1959, pages 34 to 43) to oxidize ferrous hydroxide in an alkaline medium into ferric oxide hydrate but not in connection with the production of $\gamma$-$Fe_2O_3$ as a sound carrier for magnetic recording. The highest pH value mentioned in said article in connection with the oxidation of ferrous hydroxide amounts to 13.1 (see the table on page 40 of said article). According to the known tables of reference a pH-value of 13.1 corresponds to an $(OH)^-$ ion concentration of not more than $0.12n$.

In accordance with the invention, subsequent to the oxidation of at least the major part of the supply of ferrous compound contained in the reaction mass a fresh quantity of the ferrous compound is preferably added to the reaction mass, the oxidation then being continued. Such an addition of a fresh quantity of the ferrous compound to the reaction mass, which addition may, if desired, be repeated one or several times, favorably affects the particles size of the ferric oxide hydrate obtained with respect to its suitability as a starting material for the production of $\gamma$-$Fe_2O_3$ as a sound carrier for magnetic recording purposes.

Particularly suitable ferrous compounds of poor solubility in water for the oxidation concerned are ferrous hydroxide, $Fe(OH)_2$ and ferrous carbonate, $FeCO_3$.

If the alkaline liquid in which the ferrous ions are oxidized into ferric ions is an aqueous solution of sodium hydroxide, it is necessary, in order to obtain the result aimed at, to wash the ferric oxide hydrate obtained with water until the pH value of the wash liquid is lower than 7.

The invention will be described more fully with reference to a few examples with relative table.

*Example 1*

A solution of 33.6 gms. of $FeSO_4 \cdot 7H_2O$ in 168 cms.$^3$ of distilled water (solution A), a solution of 12.9 gms. of anhydrous $Na_2CO_3$ in 100 cms.$^3$ of distilled water (solution B) and a solution of 46.3 gms. of NaOH in 180 cms.$^3$ of distilled water (solution C) are produced, the latter solution being cooled to room temperature. While stirring vigorously, the solution B is added to the solution A, after which under continued stirring the solution C is added. The mixture thus formed is termed in this example briefly "mixture (A+B+C)." For 96 hours, at room temperature, with a speed of 5 liters a minute air is passed through the liquid. Then an equal quantity of the mixture (A+B+C) is added. Then again for 120 hours, at room temperature with a speed of 5 liters a minute air is passed through the liquid. The precipitate formed in the solution is filtered off and washed with distilled water until the pH of the washing liquid has dropped to a value of 6, after which the precipitate is rinsed with acetone and dried in air. The dried powder is converted by reduction and subsequent oxidation into magnetic iron oxide, $\gamma$-$Fe_2O_3$. The powder obtained is used to produce a magnetic lacquer, which is applied to a tape-shaped carrier. The results of the measurements performed on the tape thus obtained are indicated in the table.

*Example 2*

A solution of 33.6 gms. of $FeSO_4 \cdot 7H_2O$ in 168 cms.$^3$ of distilled water (solution A) and a solution of 78.3 gms. of KOH in 280 cms.$^3$ of distilled water (solution B) are produced, the latter solution being cooled to room temperature. While stirring vigorously, the solution B is added to the solution A. Then, for 94 hours, at room temperature at a rate of 5 liters a minute air is passed through the mixture obtained, termed briefly herein "mixture (A+B)." Then an equal quantity of the mixture (A+B) is added. For 120 hours, at room temperature and at a rate of 5 liters a minute air is passed again through the liquid. The precipitate formed in the solution is filtered off and washed with distilled water until the pH of the washing liquid has dropped to a value of 6, after which it is rinsed with acetone and dried in air. The dried powder is converted by reduction and subsequent oxidation into magnetic iron oxide $\gamma$-$Fe_2O_3$. A magnetic lacquer is made from the powder obtained and applied to a tape-shaped carrier. The results of the measurements carried out on the magnetic tape thus obtained are indicated in the table.

*Example 3*

A solution of 33.6 gms. of $FeSO_4 \cdot 7H_2O$ in 168 cms.$^3$ of distilled water (solution A) and a solution of 56 gms. of NaOH in 280 cms.$^3$ of distilled water (solution B) are produced, the latter solution being cooled to room temperature. While stirring vigorously the solution B is added to the solution A. For 94 hours, at room temperature and at a rate of 5 liters a minute air is passed through the mixture obtained, termed briefly herein "mixture (A+B)." Then an equal quantity of the mixture (A+B) is added. For 120 hours, at room temperature and at a rate of 5 liters a minute air is again passed through the liquid. The precipitate formed in the solution is filtered off and washed with distilled water until the pH of the washing liquid has dropped to the value of 6, after which it is rinsed with acetone and dried in air. The dried powder is converted by reduction and subsequent oxidation into magnetic iron oxide $\gamma$-$Fe_2O_3$. A magnetic lacquer is made from the powder obtained and applied to a tape-shaped carrier. The results of the measurements carried out on the magnetic tape thus obtained are indicated in the table.

*Example 4*

A solution of 268.8 gms. of $FeSO_4 \cdot 7H_2O$ in 1345 cms.$^3$ of distilled water (solution A) and a solution of 448 gms. of NaOH in 2240 cms.$^3$ of distilled water (solution B) are produced, the latter solution being cooled to room temperature. While stirring vigorously the solution B is added to the solution A. For 138 hours, at room temperature and at a rate of 5 liters a minute air is passed through the liquid obtained. The precipitate obtained in the liquid is filtered off and washed with distilled water until the pH of the washing liquid has dropped to the value of 6, after which it is rinsed with acetone and dried in air. The dried powder is converted by reduction and subsequent oxidation into magnetic iron oxide $\gamma$-$Fe_2O_3$. A magnetic lacquer is made from the magnetic powder and applied to a tape-shaped carrier. The results of the measurements carried out on the magnetic tape thus obtained are mentioned in the table.

In the following table are indicated the results of measurements carried out on the one hand on four magnetic tapes of the best types hitherto known (tapes No. I, II, III, and IV) and on the other hand on four magnetic tapes according to the invention provided with magnetic lacquers containing $\gamma$-$Fe_2O_3$ produced as described in the above Examples 1, 2, 3 and 4 (tapes No. V, VI, VII and VIII respectively). The values of the noise indicated in the table refer to the so-called bias noise, i.e., the noise measured with a switched-on "bias" field. The bias field, as is known, is a linearising high-frequency alternating field, which is generally used with magnetic sound recording and reproducing and serves for restricting sound distortion. The numercial values in the table are comparison values, tape I being chosen as a standard. The maximum signal strength, the noise and the ratio between the same, mentioned in the table the signal-to-noise ratio, of tape I are arbitrarily assumed to have the values "100," "10" and "1" respectively.

| Tape No. | Magnetic lacquer with $\gamma$-$Fe_2O_3$ as prepared according to— | Maximum strength of the signal | Noise level | Signal: noise ratio |
|---|---|---|---|---|
| I | | 100 | 10 | 1 |
| II | | 92 | 11.9 | 0.76 |
| III | | 67 | 10.6 | 0.65 |
| IV | | 50 | 10.6 | 0.47 |
| V | Example 1 | 93 | 5.0 | 1.82 |
| VI | Example 2 | 110 | 5.3 | 2.06 |
| VII | Example 3 | 97 | 6.1 | 1.53 |
| VIII | Example 4 | 58 | 4.2 | 1.35 |

From this table it will be seen that the magnetic tape according to the invention has a better quality as compared with that of the best magnetic tapes hitherto known.

What is claimed is:

1. A method of producing a powder for magnetic recording having an increased signal-to-noise ratio comprising the steps of oxidizing a ferrous compound relatively insoluble in water in an alkaline liquid consisting essentially of water and having an $(OH)^-$ ion concentration of more than 0.2 normal by passing an oxidizing gas through the alkaline liquid containing the ferrous compound to form crystalline ferric oxide hydrate having a chemical composition corresponding to the formula $Fe_2O_3 \cdot nH_2O$, in which $1 \leq n \leq 2$, and converting said ferric oxide hydrate by reduction and subsequent oxidation into magnetic iron oxide, $\gamma$-$Fe_2O_3$.

2. A method as defined in claim 1 in which subsequent to the oxidation of at least the major part of the initial quantity of ferrous compound in the reaction mass a fresh quantity of the ferrous compound is added to the reaction mass and the oxidation is continued.

3. A method as defined in claim 1 in which the alkaline liquid is an aqueous solution of sodium hydroxide.

4. A method as defined in claim 3 in which the ferric oxide hydrate is washed with water until the pH value of the wash water is lower than 3.

5. A method as defined in claim 1 in which the ferrous compound is $FeCO_3$.

6. A method as defined in claim 1 in which the oxidizing gas is air.

References Cited by the Examiner

UNITED STATES PATENTS

| | | | |
|---|---|---|---|
| 2,560,970 | 7/1947 | Martin | 23—200 |
| 3,015,628 | 1/1962 | Ayers et al. | 23—200 X |

MILTON WEISSMAN, *Primary Examiner.*

OSCAR R. VERTIZ, *Examiner.*

J. J. BROWN, *Assistant Examiner.*